United States Patent
Schreiber

[15] 3,698,133
[45] Oct. 17, 1972

[54] SEED HAVING A MULTIPLE LAYERED COATING AND PROCESS FOR PREPARING SAME

[72] Inventor: Kurt Schreiber, Winnipeg, Manitoba, Canada

[73] Assignee: Canadian Patents and Development Limited, Ottawa, Ontario, Canada

[22] Filed: Dec. 21, 1970

[21] Appl. No.: 100,381

[30] Foreign Application Priority Data

Feb. 5, 1970 Canada..................074077

[52] U.S. Cl. ..................47/57.6, 117/3, 117/72, 117/73, 117/84, 117/85, 117/91, 117/92, 117/100 A
[51] Int. Cl..............................................A01c 1/06
[58] Field of Search...........117/3, 100 A, 72; 47/57.6

[56] References Cited

UNITED STATES PATENTS 3,545,129   12/1970   Schreiber et al...........117/3 X
3,561,159   2/1971    Adams.........................47/57.6
2,502,809   4/1950    Vogelsang..................117/3 X
2,967,376   1/1961    Scott..........................47/57.6

*Primary Examiner*—Ralph Husack
*Attorney*—James R. Hughes

[57] ABSTRACT

A plant seed having a multiple coating thereon, said multiple coating comprising (1) an inner porous coating which is permeable to water comprising a water insoluble particulate material dispersed throughout a water soluble binder and (2) an applied outer coating of a non-elastomeric material, such as a polymer, said material in film form having a controlled permeability to water and an elongation to breaking less than about 250 percent and said coating being of a thickness such that it will control the water imbibition of the seed to the extent necessary to delay germination until environmental conditions are satisfactory to continued crop growth.

25 Claims, No Drawings

SEED HAVING A MULTIPLE LAYERED COATING AND PROCESS FOR PREPARING SAME

This invention relates to a plant seed having a multiple coating thereon, especially a two layer coating and a process for preparing such seed.

In the prairie provinces of Canada as well as in other climatically similar regions located in other countries, the cultivation of higher yielding winter crops is impractical due to the severe winter conditions. Spring seeding is, in spite of temperatures conducive for the germination of seeds, usually delayed by three to four weeks due to adverse weather conditions, such as morning frost, high winds and excess of moisture. With the relatively short growing periods available, this delay in seeding frequently prevents timely maturing of the crop and, as a rule, reflects adversely in yields and qualities of various crops.

Other areas of the world have different but equally vexatious climatic problems to the attainment of a maximum growing season. For example some areas have a short rainy season in the spring which is sufficient with the natural seed to induce germination but insufficient to support normal development to maturity. That season is followed by an arid period during which the young seedlings will have a high mortality. Subsequently the optimum conditions arrive but too late to save much of the crop. If planting is delayed until the optimum conditions, obviously a significant part of the growing season is used up in the induction of germination. If planted too early the germinated seeds will perish.

Still other areas have different climatic cycles that make attainment of the maximum period of optimum growing time virtually impossible in a practical sense.

If the seed is to be exposed to the optimum growing season it must be in position in the ground and ready to germinate at the earliest possible moment when environmental conditions are satisfactory to continued crop growth. To achieve that aim is the principal object of this invention.

Another object is to so treat a seed that it may be planted before the ideal conditions for crop growth and be in position to obtain early emergence in the period of ideal conditions.

As associated object is to provide such a seed treatment with sufficient built in flexibility to be capable of withstanding a wide variety of climatic conditions.

Still another object of the present invention is the provision of a procedure for preparing the novel coated seeds.

The attainment of the above and related object is achieved with a seed having a multiple coating thereon, the multiple coating comprising (1) an inner porous coating which is permeable to water and (2) an applied outer coating of a material having (a) a permeability to water such that a seed coating made therefrom will control the water imbibition of the seed to the extent necessary to delay germination until environmental conditions are satisfactory to continued crop growth and (b) physical properties, such as elongation, of such a character that the coating will rupture when the seed has passed the period of needed protection and has entered the period when germination and growth are desired.

The objects are further realized by the seed coating process comprising the deposition of at least one thin enveloping coating of a suitable material onto the seed to form the inner coating followed by the deposition of at least one thin enveloping coating of a suitable material onto the seed to form the outer coating.

Basically the concept of the present invention is such that the outer coating will (1) maintain its integrity during periods of climatic conditions that might or might not induce germination with uncoated seeds but in either event would be unfavorable for continued crop growth and will (2) rupture prior to such climatic conditions favorable to both germination and continued crop growth. Thus the inventive concept permits the tailoring of seed coatings for achieving optimum germination and growth while allowing early planting within a wide time period. Other advantages also accrue from the concept. For example, additives such as fungicides can be formulated into the coating composition to protect the seedlings against disease attacks. Other additives may also be used to improve the storage life of the seeds and for any particular function that might be desired. The automatic synchronization of the germination of the seed and growth of the plant to the optimum climatic conditions is the principal benefit. The concept is of equal utility in prairie provinces of Canada and the northern plain states of the United States where survival over a cold season is the problem and in those areas of the world, such as the Middle East, where survival over a hot arid season is desired, as well as in other parts of the world wherever environmental problems exist.

The inner coating is made of a composition which when dried is of controlled permeability to water and which may also influence the permeation of water through the outer coating. Typically this composition will comprise a water insoluble solid particulate coating material and a binder. A plasticizer and a moisture control agent may also be incorporated if desired. One material may serve a multiple function so that frequently a two component formulation will suffice.

Representative of the water insoluble solid particulate coating materials useful for the inner coating are sandy loam, powdered talc, ground limestone, powdered charcoal, powdered silica, gypsum, powdered feldspar, powdered vermiculite, kaolin and ground peat moss. For use herein the maximum particle size of the coating material must not exceed the desired thickness of the inner coating.

Among the binders useful herein are molasses, granulated sugar, aliginates, karaya gum, jaguar gum, tragacanth gum, polysaccharide gum and mucilage.

To facilitate coating of the seed it may be desired to include a plasticizer in the coating formulation. Such materials are liquids at the temperature used for coating and generally should be miscible with the binder. Plasticizers are readily available materials and include typically glycerol, propylene glycol, and polyglycols. When a plasticizer is employed it will usually be in an amount not exceeding about 10 percent of the weight of binder. Preferably the plasticizer is maintained at the minimum needed to achieve the desired rheology in the coating procedure and will be at a concentration of about 1 percent of the binder weight. Suitable selection of plasticizer and its amount may be made by perusal of standard references and simple determinations of viscosity and other properties.

Since the rate of moisture penetration to a seed is an important, and frequently vital, agronomical consideration, it may be desired to include an agent in the inner coating formulation to control that factor. Useful moisture control agents are exemplified by materials such as cellulose ethers and esters including methyl cellulose and carboxymethyl cellulose.

It may be advantageous to include, in the inner coating, materials which provide the proper oxidation state for the germinating seed and also to provide a disinfecting fungicide. It has been found that the addition of from 2 to 3 ml. of hydrogen peroxide and one-half gram of tannic acid and one-half gram of pyrogallol per 1,000 grams of coating solids results in superior germination of the seed. This addition is most effective if the pH of the coating material is maintained at about 8.0.

The thickness of the inner coat will generally vary from about 1 to 3 millimeters depending upon the initial shape of the seed. It should be appreciated that the coating thickness should be kept to the minimum needed to function properly. Any coating thickness over the minimum will increase the cost of materials used and of the coating procedure. Also in such instance the increased seed size will cause the cost of seed storage to rise considerably. The optimum thickness for a given situation will vary because of the seed, the climatic conditions to be overcome, and the particular formulation. However, simple routine experiments will permit the determination of the thickness to be used.

It is understood that the inner coating may be applied as a single film from one application or may be built up to the desired thickness in multiple films or layers with the preceding layer dried or not depending primarily upon the coating capabilities of the apparatus used. Although in the multiple layer technique it is beneficial for the layers to coalesce into a single entity that is not necessary to attainment of the objectives.

It is not necessary that the inner coating be completely adherent to the seed. Its function will be served when it does envelop the seed with a continuous coherent although heterogeneous structure.

The inner coating is usually deposited from an aqueous system in which the coating materials are uniformly dispersed. To aid in dispersibility as well as to provide other rheological advantages it may be found to be desirable to add an aqueous organic solvent vehicle for the coating. The solids concentration will be dictated by the coating procedure to be used and the thickness of the desired coating.

The outer coating provides the prime resistance to undesirable environmental conditions which would permit an untreated seed to germinate but would restrict and hinder its continued growth and development and possibly kill the seedling. At the same time the outer coating must be inherently fissionable prior to agronomically suitable environmental conditions such that germination and growth will not be unduly delayed. A natural condition of soil frost might mediate the fission process under one type of environmental condition. To achieve that goal the outer coating must be continuous, preferably homogeneous, and be of a composition having the desired characteristics when applied in a practical thickness.

To function in the manner of this invention the outer coating should exhibit a water vapor transmission rate (hereinafter referred to as WVTR) between about 0.3 and 35 grams water/100 in.$^2$ of 1 mil film/24 hours as measured by ASTM E 96–66. Outer coatings which exhibit water vapor transmission values outside of those stated limits will not be generally capable of functioning to satisfy the desired agronomical objectives.

Another coating parameter involved in meeting the objectives of the invention is the elongation to breaking of the coating. For the herein stated purposes that elongation to breaking should be less than about 250 percent as measured by ASTM D 882–67. When materials, such as elastomers, having greater elongation than the stated value are used, the coating merely continues to swell under the stress of water imbibition but does not fracture. In such instances the seed suffers loss of viability through exhaustion of its energy systems.

The necessary property of water vapor permeability is influenced not only by the coating formulation but also by the coating thickness. Coating thickness will also determined the stress necessary to cause elongation and subsequent rupture of the coating. A coating material having a high WVTR may be applied in greater thickness than one having a low WVTR to achieve a coating of about the same permeability. As a general rule the composition capable of achieving the stated objectives in the thinnest section will be preferred. The most practical thickness range for the outer coating will be from about 0.01 to 0.1 millimeter.

The outer coating must be of a film forming composition which is capable of deposition onto the seed in the desired thickness. Many materials are satisfactory as the film forming component of the outer coating.

An advantageous genus of materials useful for forming the outer coating is the class of polymers including those of natural origin, such as shellac and beeswax; modifications of natural polymers, such as the cellulose ethers and esters which are water insoluble or difficulty soluble; and the synthetic manmade polymers prepared by the polymerization of monomeric entities. The latter group of synthetic polymers is readily available, permits easy tailoring of properties for a given situation, and is useful with a variety of conventional application techniques utilizing existing coating equipment. For these reasons and others, this group of synthetic polymers are a preferred subgenus of materials for use as the film forming component of the outer coating.

Typical of those preferred polymers are the polymers and interpolymers ethylenically unsaturated monomers such as vinyl chloride, vinylidene chloride, vinyl alkanoates, such as vinyl acetate, and the alkyl acrylates and methacrylates. To achieve the most useful properties of the coating as well as facile film formability it is usually desirable to interpolymerize two or more of the monomers. That is readily accomplished by known polymerization methods. In the case where vinyl chloride is the polymer used it is preferable if it is in the form of an interpolymer of at least 50 weight per cent vinyl chloride with the remainder of at least one other monoethylenically unsaturated comonomer and for alkyl acrylate it is preferable in the form of an interpolymer of at least 50 weight per cent alkyl acrylate with the remainder of at least one other monoethylenically unsaturated comonomer.

Also representative of the preferred subgenus are the polymers prepared by condensation polymerization of monomers to form polyesters, polyamides and other known species resulting from this technique.

The above delineation of synthetic polymers is intended only to be exemplary of those useful herein. Standard reference works in the literature of polymers will suggest other monomer combinations meeting the criteria for functioning in the present invention. Polymer systems having marginal film formability may have that characteristic upgraded by incorporation of small amounts of known plasticizers. Likewise, some polymer systems require stabilization to inhibit degradation of their properties and the inclusion of light, heat, oxidation and other stabilizers is within the comprehension of this concept. Further, it may be desirable to color code seeds of different species, of different distributors or for other reason so that inclusion of conventional colorants is comprehended. Any additive incorporated in the outer coating composition should be able to perform its intended function without detracting unduly from the coating properties or affecting the seed.

Depending upon the coating apparatus and technique employed, the film forming component may be deposited from a variety of coating media. Aqueous latexes are a particularly useful and versatile form for preparing the desired formulation and for depositing the coating and accordingly are preferred.

Although the concept of this invention depends essentially on the two coats, it is within the comprehension hereof to include other coats intermediate between the inner and outer coats. Because of economics, severity of the environmental situation, or for other reason the use of such an intermediate coat may be the most simple means to optimize the functionality of the coating system for a given situation.

When an intermediate coating is employed it is preferably a thin layer of methyl cellulose or a blend of cellulose ethers, such as ethyl cellulose and methyl cellulose, deposited from aqueous and/or alcohol solution. This intermediate coat serves to separate the inner coating from the outer coating. The intermediate coating may serve in some cases to maintain the inner coating in a physically intact state. Also when the intermediate coat is semi-permeable to water, it provides an additional delay mechanism to serve the purpose of the outer coating previously described. Water permeability of the intermediate coating can be adjusted by changing the proportions of the methyl cellulose (which is water soluble) to ethyl cellulose (which is water insoluble). The thickness of the layer ranges from 0.05 to 0.10 mm. The solubility of cellulose ethers is well documented in the literature on the subject and selection of a suitable solvent will be easily determined by reference thereto. The intermediate coating is normally applied as a 4–5 percent solution in the selected solvent.

Some seeds, such as sunflower seeds, are encapsulated with a natural coating. In such instances the coatings may be applied directly onto that natural coating to secure the benefits of this invention.

One apparatus suitable for use in coating the seeds is one which is known as a Wurster air suspension apparatus and is embraced by U. S. Pat. Nos. 2,648,609 issued Aug. 11, 1953 to Dale E. Wurster and 2,799,241 issued July 16, 1957 to Dale E. Wurster.

The concept of this invention is illustrated in the following examples wherein all parts and percentages are by weight unless otherwise indicated.

The seed coating procedure used in the following examples is an adaptation of that claimed in U. S. Pat. No. 2,648,609 wherein an air stream is moved in a confined space upwardly past the seeds with a force sufficient to suspend them continuously therein, and introducing the coating fluid in the form of an atomized mist into the air stream prior to its contact with the seeds. It is also to be observed that in this modification, the air stream is heated to dry quickly the coating applied to the seeds.

The operation of the procedure using the apparatus heretofore described may be briefly summarized in he following terms. Heated air is forced through the apparatus by means of a blower. The coating solution is atomized through a spraying nozzle and is deposited on the seed to be coated in thin layers which are quickly dried under the influence of the heated drying air. The rapid drying provides a cooling effect which prevents heating of the product. Application of a plurality of thin, consecutive layers of coating materials soon add up to the total coating required. The degree of dryness of the finished coat can be controlled by conditions within the apparatus during the coating operation.

It has been found that the following operating conditions are of the 6-inch Wurster apparatus suitable for carrying out preferred embodiments of the present invention:

| Operating Conditions | Inner Coating | Intermediate Coating (when used) | Outer Coating |
| --- | --- | --- | --- |
| Inlet temp. | 100–110°F | 100–125°F | 100–130°F |
| Outlet temp. | 80–100°F | 90–115°F | 90–120°F |
| Air flow rate | 74–150 cfm | 150 cfm | 150 cfm |
| Atomizing air pressure | 30–40 psi | 40 psi | 40 psi |
| Nozzle size | 40–100–120 or 60–100–120 | 20–50–70 or 28–50–70 | 20–50–70 or 28–50–50 |

The general technique for the production of the seed of an aspect of the present invention may be described as follows:

Approximately 500 grams of seed which may, for example, be spring wheat, was used in one run. The materials used for the inner coating are blended with the solvent to form a suspension. The coating process is commenced with a slow pumping rate, which is thereafter controlled to prevent conglomeration of the seed. The initial processing air flow is approximately 50 cfm and gradually increased to approximately 150 cfm as the seed size increases. The time involved for the whole procedure is approximately one hour.

The outer coating is then applied to approximately 500 grams of the seed which is coated with the inner coating and intermediate coating if used. Smaller nozzles are used for the production of the outer coating and therefore the coating time varies from one-half to six hours.

EXAMPLE 1

Seeds were coated according to the procedure mentioned above. In each case the inner coat was of vermiculite and molasses, the intermediate coat was of a water soluble methyl cellulose of 15 centipoises viscosity grade and the outer coat was as listed in the following Table I wherein:

Latex A is of a polymer of 62.8 percent butyl acrylate, 34.3 percent acrylonitrile and 3.1 percent methacrylic acid.

Latex B is of a polymer of 75 percent vinyl chloride and 25 percent vinylidene chloride.

Latex C is of polymer of 75 percent vinylidene chloride, 20 percent vinyl chloride and 5 percent ethyl acrylate.

TABLE I

| Run No. | Latex | Vol. latex (ml) | Plasticizer | Amount plasticizer (ml) | Gram Seeds |
|---|---|---|---|---|---|
| 1 | A | 50 | — | — | 750 |
| 2 | A | 75 | — | — | 750 |
| 3 | A | 100 | — | — | 750 |
| 4 | B | 50 | diethyl phthalate | 4 | 750 |
| 5 | B | 75 | diethyl phthalate | 6 | 750 |
| 6 | B | 100 | diethyl phthalate | 8 | 750 |
| 7 | C | 50 | — | — | 750 |
| 8 | C | 75 | — | — | 750 |
| 9 | C | 100 | — | — | 750 |

Some of the seeds of each Run were planted September 27 and others on October 11 in Southern Manitoba, Canada. A fall and spring germination percentages were recorded.

The results showed that all the formulations of Latexes A and C exhibited no germination in the fall and but negligible germination (i.e. <5 percent) in the spring. With Latex B the September planting exhibited about 10 percent fall germination nd the October planting no fall germination. In the October Planting Run 4 had 100 percent, Run 5 had 82 percent and Run 6 had 57 percent spring germination.

In a contrasting series of experiments seeds were coated with the methyl cellulose coat and the identified outer coat but eliminating the inner coat. When planted all seeds suffocated and died.

EXAMPLE 2

Wheat seeds were coated with a vermiculite and molasses inner coat and an intermediate coat of methyl cellulose. Other seeds were not coated and used as a control. Some of the coated seeds were coated with Latex A as an outer coating and others with Latex C in both cases at the rate of 50 cc latex on 675 grams seed.

The seeds were planted in small cans of soil (disinfected and regular) and maintained indoors under climatic conditions typical of Israel. The cans were lightly watered, allowed to stand two weeks, then watered substantially and kept moist. The results follow:

| Run No. | Treatment | Total Germination | 1st Irrigation | Germination after 2nd Irrigation |
|---|---|---|---|---|
| 10 | Control disinfected soil | 95 | 45 | 50 |
| 11 | Latex A | 70 | 0 | 70 |
| 12 | Latex C | 90 | 40 | 50 |
| 13 | Control regular soil | 50 | 15 | 35 |
| 14 | Latex A | 40 | 0 | 40 |
| 15 | Latex C | 45 | 10 | 35 |

This example represents the use of the concept with a different climatic problem from that of the previous example.

EXAMPLE 3

1,000 grams of wheat seeds were coated with an inner coat of 500 grams vermiculite and 100 cc's molasses; on that was added an intermediate coat of 50 grams methyl cellulose and 25 cc glycerin over 2,000 grams of the coated wheat. Finally an outer coat of 43 cc Latex B plus 4.3 cc diethyl phthalate was mixed in a Waring Blender with 250 cc water and applied over 650 grams of seeds with the mentioned inner and intermediate coat. These seeds will be identified as Run No. 16.

1,100 grams of the same wheat seeds were coated with an inner coat of 1,100 grams ground limestone and 185 cc molasses to give about 2150 grams of coated seeds. An outer coat of 100 cc of Latex B with 10 cc's diethyl phthalate was applied to 900 grams of the seeds with the mentioned inner coat. These seeds will be identified as Run No. 17.

Samples of each batch of coated seed were placed in an oven at 100°F with 100 percent relative humidity and examined for coating rupture after 90 to 116 hours exposure. The seeds of Run No. 16 showed that 3 percent and 4 percent has ruptured respectively. The seeds of Run No. 17 exhibited 1 percent and 5% rupture respectively. Thus both coatings will protect the seeds from germinating during a warm wet period.

EXAMPLE 4

This example illustrates the inter-relationship between water imbibition of the seed, the WVTR of the coating material and the tendency to rupture the outer coating.

Wheat coated in various ways was weighed and placed in 100 percent relative humidity environment at 72°F. After 200 hours exposure, the wheat was weighted again to determine the water imbibition. The percentage of seeds that suffered rupture in the hereinbefore mentioned accelerated humid oven test of Example 3 was also determined. The results of these experiments are recorded, together with details of the coating, in the table below.

| Seed | Number of Coatings | Latex type | Latex WVTR (grams) | Latex elongation % | Water imbibed per seed (mgms) | % Rupture |
|---|---|---|---|---|---|---|
| 1 | 2 | A | 30 | 150 | 23 | 80 |
| 2 | 3 | A | 30 | 150 | 20 | 90 |
| 3 | 3 | B | 3.5 | 190 | 3.5 | 4 |
| 4 | 2 | B | 3.5 | 190 | 3.9 | 5 |
| 5 | 3 | C | 0.3 | 250 | 0.8 | 0 |

The results show that seeds coated with latex of highest WVTR inbibe water at the greatest rate and rupture most readily. Seed 3 in this example is similar to that used in Run 4 in the planting trials of Example 1 and seed 2 is similar to that used in Run 11 in planting trials of Example 2.

The tests given in this example are invaluable in deciding on the particular coating to be used for planting seed in a given climatic environment.

EXAMPLE 5

1,100 grams wheat was coated with 1,100 grams of limestone and 180 mls molasses as binder for the inner coat. 900 g of this inner coated wheat was then taken and coated with an outer coat consisting of 100 ml of latex B and 10 ml of DEP as plasticizer. This coated wheat was planted in flats and maintained in greenhouses under ideal conditions with temperature in the range 60°–70°F and daily watering. No germination occurred in four weeks. The flats were then placed in a cold room at 20°F for eight days to simulate winter and subsequently returned to the greenhouses. One week after this 80 percent of the wheat had germinated. Uncoated wheat germinated under the same conditions within 3 days.

EXAMPLE 6

Flax, Rape, Sunflower, Canary Grass were coated and planted in the fall in Southern Manitoba. The coated seeds survived the winter and emerged by the end of April. After the emergences the seedlings were exposed to 22°F without injury. Uncoated seed of these plants planted at the end of April showed no such frost resistance after emergence.

It should be apparent that the particular compositions to be employed will depend upon the seed to be coated and the climatic problem to be overcome. Judicious determination of the optimum composition for the given situation may be made within the aforementioned guide lines by simple accelerated laboratory screening tests.

In a similar manner seeds of barley, oat, triticale, corn, sunflower, sugar beet, rape, safflower, flax, canary grass, tomatoes, cotton seed and peanuts have been coated and planted in Candada, United States and Japan with the desired delay in germination until the most favorable conditions appear.

In addition to the previously mentioned benefits it has been observed that the instant concept provided plants with better root development and better drought resistance, more tillers with fully developed spikes, shorter but stronger straw, superior yield, and improved quality (more protein).

The embodiments of the invention in which an exclusive property or privilege is claimed are defined as follows:

1. A seed having a multiple layered coating thereon, said multiple layered coating comprising:
   a. an inner porous coating permeable to water and comprising a water insoluble particulate material dispersed throughout a water soluble binder, and
   b. in continuous contact with said inner coating an applied outer coating of a natural or synthetic polymeric material which said outer coating has physical and chemical properties of an elongation to break of less than about 250 percent and a water vapor transmission rate of between about 0.3 to about 35 grams water per 100 square inches of one mil film per 24 hours and is of a thickness such that said outer coating controls water imbibition of the seed to the extent necessary to delay germination until environmental conditions are satisfactory to continued crop growth.

2. The coated seed claimed in claim 1 wherein said solid particulate material is a pulverulent essentially inert water insoluble material.

3. The coated seed claimed in claim 1 wherein said water soluble binder is sugar, alginates, natural gums, mucilage or molasses.

4. The coated seed claimed in claim 1 wherein said inner coating also contains a plasticizer for said binder.

5. The coated seed of claim 1 wherein said outer coating consists essentially of a synthetic polymeric material.

6. The coated seed of claim 5 wherein said synthetic polymeric material is a vinyl chloride polymer.

7. The coated seed of claim 6 wherein said vinyl chloride polymer is an interpolymer of at least 50 weight percent vinyl chloride with the remainder of at least one other monoethylenically unsaturated comonomer.

8. The coated seed of claim 7 wherein said comonomer is vinylidene chloride.

9. The coated seed of claim 5 wherein said synthetic polymeric material is an interpolymer of at least 50 weight percent of an alkyl acrylate with any remainder of at least one monoethylenically unsaturated comonomer.

10. The coated seed of claim 9 wherein said interpolymer is composed of butyl acrylate, acrylonitrile and methacrylic acid.

11. The coated seed of claim 5 wherein said coating of synthetic polymeric material contains a plasticizer.

12. The coated seed of claim 11 wherein said plasticizer is a dialkyl phthalate.

13. The coated seed of claim 12 wherein the dialkyl phthalate is diethyl phthalate.

14. A process for the preparation of coated seeds which comprises:
   a. depositing on the seeds to be coated a thin film of an inner coating composition comprising a water insoluble solid particulate material and a water soluble binder therefore dispersed in a continuous phase vehicle and drying said composition to give an inner coating of 1.0 to 3.0 millimeter thickness on said seeds, and
   b. depositing on the dried inner coating in step (a) of the seeds a thin film of an outer coating composition comprising a film forming natural or synthetic polymer material dispersed in an aqueous continuous phase vehicle and drying said composition to provide an outer coating of from 0.05 to 0.10 millimeter thickness on said seeds.

15. The process of claim 14 wherein said film forming material is a synthetic polymeric material.

16. The process of claim 15 wherein the outer coating composition is an aqueous latex of said synthetic polymeric material.

17. The process of claim 16 wherein said synthetic polymeric material is vinyl chloride polymer.

18. The process of claim 17 wherein said vinyl chloride polymer is an interpolymer of at least 50 weight percent vinyl chloride with the remainder of at least one other monoethylenically unsaturated comonomer.

19. The process of claim 18 wherein said comonomer is vinylidene chloride.

20. The process of claim 15 wherein said synthetic polymeric material is an interpolymer of at least 50 weight per cent of an alkyl acrylate with any remainder of at least one monoethylenically unsaturated comonomer.

21. The process of claim 15 wherein said coating of synthetic polymeric material contains a plasticizer.

22. The process of claim 21 wherein said plasticizer is a dialkyl phthalate.

23. The process of claim 22 wherein the dialkyl phthalate is diethyl phthalate.

24. The process of claim 14 wherein said inner coating composition comprises the coating ingredients dispersed in an aqueous vehicle.

25. The process of claim 14 wherein each of the coatings of steps (a) and (b) consists of the deposition of a plurality of thin successively applied coatings of a number to attain the said thickness.

* * * * *